US005716569A

United States Patent [19]

Berenbold et al.

[11] Patent Number: 5,716,569

[45] Date of Patent: Feb. 10, 1998

[54] GRANULATED BLEACHING ACTIVATORS AND THEIR PREPARATION

[75] Inventors: Helmut Berenbold, Wiesbaden; Georg Borchers, Bad Nauheim; Jürgen Cramer, Eppstein; Gerhard Nöltner, Frankfurt am Main; Gerd Reinhardt, Kelkheim; Wilfried Schuler, Limburg, all of Germany

[73] Assignee: Hoechst Aktiengesellschaft, Germany

[21] Appl. No.: 550,683

[22] Filed: Oct. 31, 1995

[30] Foreign Application Priority Data

Nov. 2, 1994 [DE] Germany .......................... 44 39 039.4

[51] Int. Cl.[6] ............................ B29C 59/02; B29C 67/02

[52] U.S. Cl. .......................... 264/115; 264/117; 264/118; 252/186.25; 252/186.38

[58] Field of Search ......................... 252/186.25, 186.38, 252/186.39; 100/35, 39; 264/117, 118, 115

[56] References Cited

U.S. PATENT DOCUMENTS

| | | | |
|---|---|---|---|
| 3,789,002 | 1/1974 | Weber et al. | 252/182.12 |
| 3,822,114 | 7/1974 | Montgomery | 8/111 |
| 4,207,199 | 6/1980 | Perner et al. | 252/186.38 |
| 4,372,868 | 2/1983 | Saran et al. | 252/186.38 |
| 4,457,858 | 7/1984 | Saran et al. | 427/203 |
| 4,539,130 | 9/1985 | Thompson et al. | 510/376 |
| 4,695,397 | 9/1987 | Sommer et al. | 524/41 |
| 4,889,651 | 12/1989 | Broze | 510/304 |
| 5,002,682 | 3/1991 | Bragg et al. | 510/311 |
| 5,047,163 | 9/1991 | Batal et al. | 510/116 |
| 5,167,852 | 12/1992 | Emery et al. | 510/513 |
| 5,244,594 | 9/1993 | Favre et al. | 252/186.33 |
| 5,246,621 | 9/1993 | Favre et al. | 252/186.33 |
| 5,318,714 | 6/1994 | Markussen et al. | 510/374 |
| 5,334,324 | 8/1994 | Zeise et al. | 510/513 |
| 5,342,542 | 8/1994 | Burzio et al. | 252/186.39 |
| 5,382,377 | 1/1995 | Raemse et al. | 510/445 |
| 5,411,673 | 5/1995 | Agar et al. | 510/312 |

FOREIGN PATENT DOCUMENTS

| | | |
|---|---|---|
| 2074178 | 7/1991 | Canada . |
| 1299460 | 4/1992 | Canada . |
| 0037026 | 10/1981 | European Pat. Off. . |
| 0070474 | 1/1983 | European Pat. Off. . |
| 0075818 | 4/1983 | European Pat. Off. . |
| 0240057 | 10/1987 | European Pat. Off. . |
| 0325100 | 7/1989 | European Pat. Off. . |
| 0446982 | 9/1991 | European Pat. Off. . |
| 0458397 | 11/1991 | European Pat. Off. . |
| 0458398 | 11/1991 | European Pat. Off. . |
| 0492000 | 7/1992 | European Pat. Off. . |
| 2048331 | 4/1972 | Germany . |
| 2733849 | 2/1979 | Germany . |
| 1507312 | 4/1978 | United Kingdom . |
| 2249104 | 4/1992 | United Kingdom . |
| WO 90/01535 | 2/1990 | WIPO . |
| WO 91/10719 | 7/1991 | WIPO . |
| WO 92/13798 | 8/1992 | WIPO . |
| WO 94/03395 | 2/1994 | WIPO . |

*Primary Examiner*—Joseph D. Anthony
*Attorney, Agent, or Firm*—Connolly & Hutz

[57] ABSTRACT

The present invention relates to a process for the preparation of storage-stable granules essentially comprising a bleaching activator and an inorganic binder material, which comprises the process steps:

a) mixing of a dry bleaching activator with a dry inorganic binder material, b) pressing of this mixture to give relatively large agglomerates and c) comminution of these agglomerates to the desired particle size.

The invention furthermore relates to the use of the granules prepared by the processes in detergents, cleaning compositions, bleaching compositions and disinfectants.

13 Claims, No Drawings

GRANULATED BLEACHING ACTIVATORS AND THEIR PREPARATION

Bleaching activators are important constituents in compact detergents, scouring salts and machine dishwashing compositions. They already allow a bleaching result comparable to washing at the boil at 40°–60° C. by reacting with hydrogen peroxide donors (usually perborates or percarbonates) to liberate an organic peroxycarboxylic acid.

The bleaching result which can be achieved is determined by the nature and reactivity of the peroxycarboxylic acid formed, the structure of the bond to he perhydrolysed and the water-solubility of the bleaching activator. Since this is usually a reactive ester or an amide, it is necessary in many cases to employ it for the envisaged field of use in granulated or coated form in order to prevent hydrolysis in the presence of alkaline detergent constituents and to ensure an adequate storage stability.

Numerous auxiliaries and processes have been described for granulation of these substances in the past. EP-A-0 037 026 describes a process for the preparation of readily soluble activator granules with active contents of between 90 and 98% by weight. For this, the pulverulent bleaching activator is mixed homogeneously with similarly pulverulent cellulose ethers or starch ethers and the mixture is then sprayed with water or an aqueous solution of the cellulose ether and granulated at the same time, and subsequently dried.

According to EP-A-0 070 474, similar granules can he prepared by spray-drying aqueous suspensions comprising the activator and the cellulose ether. Granules comprising bleaching activator, cellulose ethers and additions of an organic $C_3$–$C_6$-carboxylic or -hydroxycarboxylic acid are described in WO 90/01535 and WO 92/13798. While in WO 90/01535 the organic carboxylic acid is incorporated into the granule core in order to accelerate its solubility, in WO 92/13798 the carboxylic acid is applied to the finished granules in an additional coating stage. The acid protective coating is said to prevent spotting of the bleaching agent and to help to protect the colour of the fabric. The use of acid polymer compounds having a water solubility of greater than 5 g/L (at 20° C.) and molecular weights of 1000 to 250,000 for the same purpose is claimed in WO 94/03395.

Granules of bleaching activators in which mixtures of soaps and free fatty acids are employed as granulating auxiliaries are likewise prior art (GB-A 1 507 312).

An anhydrous preparation process is disclosed by EP-A-0 075 818. For this, the bleaching activator is pressed together with an organic binder, for example a fatty alcohol ethoxylate, by compaction under pressure to give particles having diameters of 0.5–3 mm.

A prerequisite of most of the granulating processes mentioned is that the bleaching activator to be granulated is a solid and has a high melting point. This is necessary so that it does not react with the binder or water present during preparation and becomes decomposed. Thus, for example, those activators which have a melting point of preferably at least 100° C., in particular at least 150° C., are preferred in DE-A-2 048 331.

Binders which have been used to date are chiefly organic compounds. However, problems can result from these, which limit the use of the granules.

If surface-active compounds, such as soaps, fatty acids, anionic surfactants or fatty alcohol ethoxylates, are employed, the granules prepared with these are unsuitable for use in machine dishwashing compositions since foam problems occur under washing conditions. This is the case even when the usually low-foaming highly ethoxylated fatty alcohols are used. Activator granules in which the binder comprises cellulose ethers are therefore chiefly used in machine dishwashing compositions. However, the biodegradability of this group of products is mediocre.

Suitable granules for use in scouring salts present another problem. Modern formulations comprise mixtures of percarbonate and TAED granules. To suppress exothermic decomposition of these mixtures (percarbonate as a fire-promoting substance in combination with organic material) during preparation and storage, inert materials, such as sodium carbonate, bicarbonate or sulfate, are often added. Inert binders or coating agents would be of great interest for this field of use.

There therefore continues to be a need for suitable activator granules which present no problems from the ecological aspect, are universally applicable and can be prepared inexpensively.

Inorganic materials as carriers for bleaching activators are known per se. DE-A-2 733 849 thus proposes the adsorption of liquid activators, such as diacetylmethylamine, diacetylbutylamine or acetylcaprolactam, onto inorganic adsorbents, such as kieselguhr, magnesium aluminum silicates, sodium silicate or calcium aluminum silicates, activated silica or aluminum oxide. However, it does not describe how these particles can be converted into suitable storage-stable granules.

Furthermore, particles in which a bleaching activator which is solid per se is deposited in finely divided form onto an inorganic carrier material can be prepared according to GB-A-2 249 104. For this, the activator and carrier material are first mixed intimately and an organic solvent (ethanol or toluene) is added, the activator dissolving. The activator is deposited in extremely finely divided form onto the carrier by subsequent removal of the solvent by distillation. The preferred particle size distribution of the particles according to the invention is between 60 and 250 μm. This specification does not describe how storage-stable granules can be prepared from the activator-laden particles.

In addition, bleaching activator granules which are prepared by mixing an activator with inorganic or organic salts, film-forming polymers and small amounts of smectites or aluminum silicates and subsequent granulation in the presence of water are disclosed by EP-A-0 240 057. After the granulation has been carried out, a cost-intensive drying stage is necessary in order to obtain storage-stable granules.

Surprisingly, it has now been found that storage-stable activator granules which have the abovementioned properties can be prepared in a simple manner if bentonites are used as binders and the granulation process is carried out under anhydrous conditions without the use of organic solvents or film-forming substances.

The present invention relates to a process for the preparation of storage-stable granules essentially comprising bleaching activator and inorganic binder material, which comprises the following process steps:

mixing of a dry bleaching activator with a dry inorganic binder material, pressing of this mixture to give relatively large agglomerates and comminution of these agglomerates to the desired particle size.

Bleaching activators which can be used according to the invention are those having melting points >60° C. Examples of these are tetraacetylethylenediamine (TAED), tetraacetylglucoluril (TAGU), diacetyldioxohexahydrotriazine (DADHT), acyloxybenzenesulfonates, such as sodium nonanoyloxybenzenesulfonate (NOBS) or benzoyloxybenzenesulfonate (BOBS), and acylated sugars, such as pentaacetylglucose (PAG), or compounds described in EP-A-0 325 100, EP-A-0 492 000 and WO 91/10719.

Other suitable bleaching agent activators are carboxylic acid esters, carboxylic acid anhydrides, lactones, acylals, carboxylic acid amides, acyllactams, acylated ureas and oxamides activated according to the prior art, and, in addition, in particular also nitriles. Mixtures of various bleaching activators can likewise be employed.

Possible inorganic binder materials are naturally occurring and/or synthetic bentonites, preferably smectitic clays selected from the group consisting of alkali metal or alkaline earth metal montmorillonites, saponites or hectorites having ion exchange capacities of preferably 50–100 meq/100 g, and in addition illites, attapulgites and kaolinites. ®Laundrosil DGA and ®Laundrosil EX 0242 from Süd-Chemie, Munich (DE) are particularly preferred.

Amorphous and/or crystalline laminar silicates, preferably crystalline, laminar sodium silicates of the formula $NaMSi_xO_{x+1}.yH_2O$, in which M is sodium or hydrogen, x is a number from 1.9 to 4 and y is a number from 0 to 20, and preferred values for x are 2, 3 or 4, are furthermore possible. Crystalline laminar silicates of this type are described, for example, in European Patent Application EP-A-0 164 514. Particularly preferred crystalline laminar silicates are those in which M is sodium and x assumes the values 2 or 3. Both β- and δ-sodium disilicates of the formula $Na_2Si_2O_5.yH_2O$ are preferred in particular, it being possible for β-sodium disilicate to be obtained, for example, by the process described in international patent application WO-A-91/08171. β-sodium disilicate is commercially obtainable under the name SKS7, and δ-sodium disilicate under the name SKS6 (commercial products from Hoechst AG, DE). These powders in general have a bulk density of less than 600 g/l and have high fine particle contents, usually more than 30% by weight with a particle size below 0.1 mm.

If required, the abovementioned inorganic binder materials can be employed as individual substances or as mixtures.

Suitable additives are substances which influence the pH during storage and use. These include organic carboxylic acids or salts thereof, such as citric acid in anhydrous or hydrated form, glycolic acid, succinic acid, maleic acid or lactic acid. Additives which influence the bleaching power, such as complexing agents, polycarboxylates and metal complexes containing iron or manganese, such as are described in EP-A-0 458 397 and EP-A-0 458 398, are also possible.

Additives which are likewise suitable are anionic and nonionic surfactants which help to dissolve the granules according to the invention faster.

Preferred anionic surfactants are water-soluble alkali metal salts of organic sulfates, sulfonates and ethersulfonates having $C_8$–$C_{31}$-hydrocarbon radicals, preferably $C_8$–$C_{22}$-hydrocarbon radicals. Examples of anionic surfactants which may be mentioned are: paraffinsulfonates, alkylbenzenesulfonates, such as sodium and potassium $C_9$–$C_{18}$-alkylbenzenesulfonates, preferably dodecylbenzenesulfonate, $C_{10}$–$C_{20}$-alpha-olefinsulfonates, $C_8$–$C_{18}$-alkyl sulfates and $C_8$–$C_{18}$-alkylether–sulfates.

Preferred nonionic surfactants are fatty alcohol polyalkoxylates, i.e. $C_8$–$C_{31}$-alcohols, preferably $C_8$–$C_{22}$-alcohols having 1–15 ethylene oxide and/or propylene oxide units.

Further additives are substances which react in the wash liquor with the peroxycarboxylic acid liberated from the activator to form reactive intermediates, such as dioxiranes or oxaziridines, and in this manner can increase the reactivity. Corresponding compounds are ketones and sulfonimines according to U.S. Pat. No. 3 822 114 and EP-A-0 446 982.

The ratio of bleaching activator to inorganic binder material is usually 50:50 to 98:2, preferably 70:30 to 96:4 % by weight, based on the total weight of the granules. The amount of additive depends in particular on its nature. Thus, acidifying additives and organic catalysts are added to increase the performance of the peracid in amounts of 0–20% by weight, in particular in amounts of 1–10% by weight, based on the total weight, while metal complexes are added in concentrations in the ppm range.

To prepare the granules, the mixture of bleaching activator and binder is first mixed intimately (step a) in a mixing unit (for example a plowshare mixer). In a second step, the mixture is pressed to give relatively large particles (step b). Roll compactors, inter alia, are suitable for this. The pressed particles are then subjected to comminution (grinding) and comminuted to the desired particle size (step c). A toothed disk mill and/or passing sieves are suitable for this purpose.

The fine content and coarse material are sieved off and recycled to the process. While the coarse content is fed directly to renewed comminution, the fine content is added to the compacting stage. The particle size of the product is generally in the range 100–2000 μm, preferably 300–1800 μm. The bulk density of the granules according to the invention is thus above 500 $kg/m^3$, preferably above 600 $kg/m^3$.

The granules obtained in this manner are suitable directly for use in detergents and cleaning compositions. In a particular use form, however, they can be provided with a coating shell.

For this, the granules according to the invention are enclosed with a film-forming substance in an additional step d), by which means the product properties can be influenced considerably.

Suitable coating materials are all film-forming substances, such as waxes, silicones, fatty acids, soaps, anionic surfactants, nonionic surfactants, cationic surfactants and anionic and cationic polymers, for example polyacrylic acids.

The abovementioned anionic and nonionic surfactants are preferably used. The preferred cationic surfactants include quaternary alkyl- and/or hydroxyalkylammonium compounds.

By using these coating materials, inter alia, the dissolving properties can be delayed, in order to suppress in this manner interactions between the bleaching activator and the enzyme system at the start of the washing process.

If the granules according to the invention are to be used in machine dishwashing compositions, waxes having melting points of 40° C. to 50° C. are especially suitable for this purpose.

Acid coating materials increase the storage stability of the granules in percarbonate-containing, highly alkaline formulations and suppress colour damage due to spotting. Additions of a dyestuff are likewise possible.

The coating materials are generally applied by spraying the molten coating materials or coating materials dissolved in a solvent. According to the invention, the coating material can be applied to the granule core according to the invention in amounts of 0–20, preferably 1–10, % by weight, based on the total weight.

The products according to the invention are distinguished by a good storage stability in pulverulent detergent, cleaning composition and disinfectant formulations.

They are ideal for use in heavy-duty detergents, scouring salts, machine dishwashing compositions, pulverulent all-purpose cleaners and denture cleaners.

The granules according to the invention are usually employed in these formulations in combination with a source of hydrogen peroxide. Examples of these sources are perborate monohydrate, perborate tetrahydrate, percarbonates and hydrogen peroxide adducts on urea or amine oxides.

In addition, the formulation can contain further detergent constituents corresponding to the prior art, such as organic or inorganic builders and co-builders, surfactants, enzymes, optobrighteners and perfumes.

PREPARATION AND USE EXAMPLES

Example 1

12.5 kg of a mixture of 92% by weight of tetraacetylethylenediamine (TAED) and 8% by weight of ®Laundrosil DGA (registered trademark of Süd-Chemie) are mixed in a 50 l Lödiger mixer at a speed of rotation of 52 rpm for 20 minutes. This mixture is pressed to cigar-shaped pads at 38° C. on a roller compactor with a pressing force of 40–50 kN and then fed to two-stage grinding. After pregrinding with toothed disk mills (Alexanderwerk), the product is comminuted in a passing sieve (Frewitt) at a mesh width of 2000 μm. This gives 6.3 kg of granules with a particle size distribution of 350–1800 μm (yield 50.2%) and a fine fraction (<350 μm) of 3.6 kg, which can be fed to renewed compacting, and a coarse fraction (1800 μm) of 2.6 kg, which can be fed to renewed grinding.

Example 2

The procedure is analogous to Example 1. 12.5 kg of a mixture of 82% by weight of TAED, 8% by weight of ®Laundrosil DGA and 10% by weight of citric acid are employed. After compacting (pressing pressure 50–60 kN, maximum temperature 57° C.) and grinding gives: 6.5 kg of granules having a particle size of between 350 and 1800 μm, 4 kg of fine fraction and 2 kg of coarse material.

Example 3

The procedure is analogous to Example 1, but instead of the ®Laundrosil DGA, ®Laundrosil EX 0242 (S üd-Chemie) is used.

Yields: 6.5 kg of granules, 3.8 kg of fine fraction and 2.2 kg of coarse material.

Example 4

The procedure is analogous to Example 2, but instead of the ®Laundrosil DGA, ®Laundrosil EX 0242 (S üd-Chemie) is used.

Yields: 6.5 kg of granules, 3.8 kg of fine fraction and 2.1 kg of coarse fraction.

Example 5

6.75 g of standard detergent without a bleaching system (WMP detergent, Wäschereiforschung Krefeld (DE)) and 0.75 g of perborate monohydrate are dissolved in 1 l of distilled water in a glass beaker temperature-controlled at 20° C., and 0.3 g of the activator is then added. The activators used are:

Granules 1: granules according to the invention from Example 1

Granules 2: comparison example according to EP-A-0 062 523.

Samples are taken at intervals of time of 1 minute and the content of peracetic acid formed is determined iodometrically.

| | Peracid liberated [%] from | |
|---|---|---|
| Time [minutes] | granules 1 | granules 2 |
| 1 | 29 | 6 |
| 3 | 68 | 17 |
| 5 | 84 | 33 |
| 7 | 93 | 50 |
| 8 | 100 | 77 |

The example clearly shows that the granules according to the invention dissolve better than the comparison granules prepared according to EP-A-0 062 523.

Example 6

The bleaching activity of the granules according to the invention is tested under conditions close to those in practice on bleaching test fabrics in an Öko-Lavamat 6753 multicomponent washing machine (AEG, Nuremberg). 14 g of softener (®Skip, Lever Europe) and 70 g of base detergent without bleach (®Skip, Lever Europe) are added to the rinse-in chambers of the washing machine intended for these in accordance with the dosage instructions for water hardness range 3. 9.6 g of $NaHCO_3$ and 8.0 g of percarbonate and a) 2.61 g of bleaching activator granules (92% purity) according to Example 1 b) 2.93 g of bleaching activator granules (92% purity) according to Example 3 c) 2.65 g of bleaching activator granules (90.5% purity) according to EP 062 523.

are added as the bleaching component in the rinse-in chamber intended for this.

2 kg of terry towelling are used as ballast, and 10 bleachable stains (tea, red wine, curry, grass and the like from Wäschereiforschung Krefeld) are used as the test stains. The laundry is washed in the main wash cycle at 40° C. The evaluation is carried out by determination of the whiteness after washing by addition of the differences in diffuse reflectance.

Result:

Total whiteness after washing:

Example 6a: 194 diffuse reflectance units

Example 6b: 192 diffuse reflectance units

Example 6c: 167 diffuse reflectance units.

The example demonstrates that significantly better bleaching results are achieved with the granules according to the invention than with the comparison granules.

Example 7

To determine the storage stability, 0.5 g of the TAED granules are stored together with 1.5 g of perborate monohydrate and 8 g of base detergent (WMP, W äschereiforschung Krefeld) in folded boxes at 38° C. and 80% atmospheric humidity in a climatically controlled cabinet (accelerated test). The TAED content remaining is determined iodometrically at defined intervals of time.

Granules employed:

B1: granules according to the invention from Example 1

B2: granules according to the invention from Example 2

B3: comparison example of granules according to EP-A-0 037 026

| Residual content of TAED (%) | | | |
|---|---|---|---|
| | B1 | B2 | B3 |
| 2 | 97 | 98 | 98 |
| 10 | 37 | 79 | 38 |
| 14 | 27 | 47 | 25 |

The example shows that granules B1 according to the invention have a storage stability comparable with the prior art, and granules B2 according to the invention (with addition of citric acid) show an even better stability.

We claim:

1. A process for the preparation of storage-stable granules containing a bleach activator and an inorganic binder material, comprising the steps of:

a) mixing a dry bleaching activator with a dry inorganic binder material to form a dry mixture, b) pressing the dry mixture with a roll compactor to give agglomerates, and c) comminuting the agglomerates to form granules, wherein said steps a, b, and c are carried out under essentially anhydrous conditions and in the absence of organic solvents and film-forming substances.

2. The process as claimed in claim 1, wherein the binder material is naturally occurring bentonite, synthetic bentonite, or naturally occurring and synthetic bentonite.

3. The process as claimed in claim 1, wherein the inorganic binder material is a smectitic clay selected from the group consisting of alkali metal or alkaline earth metal montmorillonites, saponites and hectorites.

4. The process as claimed in claim 1, wherein the inorganic binder material is an amorphous silicate, crystalline laminar silicate, or amorphous and crystalline laminar silicate.

5. The process as claimed in claim 1, wherein the bleaching agent activator is an N-acylated amine, amide, lactam, carboxylic acid ester, carboxylic acid anhydride, or carboxylic acid ester and carboxylic acid anhydride.

6. The process as claimed in claim 1, wherein the ratio of bleaching activator to inorganic binder material is 50:50 to 98:2, in % by weight, based on the weight of the granules.

7. The process as claimed in claim 1, wherein the granules comprise 0 to 20% by weight, based on the total weight, of an additive selected from the group consisting of inorganic acids, organic acids, complexing agents, ketones and metal complexes.

8. The process as claimed in claim 1, wherein the particle size of the granules is in the range 100–2000 μm.

9. The process as claimed in claim 1, wherein the granules are additionally coated with a coating layer after process step c).

10. The process as claimed in claim 1, wherein the ratio of bleaching activator to inorganic binder material is 70:30 to 96:4, in % by weight, based on the weight of the granules.

11. The process as claimed in claim 1, wherein the particle size of the granules is from 300 to 1800 μm.

12. A process for the preparation of storage-stable granules containing a bleach activator and a inorganic binder material, comprising the steps of:

a) mixing a dry bleaching activator with a dry, powdered inorganic binder material to form a dry mixture consisting essentially of:

said bleaching activator, said dry, powdered inorganic binder material, which binder material is a natural or synthetic silicate or a combination of natural and synthetic silicates having more than 30% by weight of its particles smaller than 0.1 mm or having an ion exchange capacity of 50 to 100 meq/100 g, and, optionally, a substance for influencing the pH during storage and use or for influencing the bleaching power of the mixture;

b) pressing the dry mixture with the pressing force applied by a roll compactor to form agglomerates from said dry mixture, and c) comminuting the agglomerates to form granules; said steps a, b, and c being carried out under anhydrous conditions and without organic solvents and film-forming substances.

13. A process as claimed in claim 12, wherein the granules obtained according to step c are provided with a coating shell by spraying them with a film-forming substance.

* * * * *

UNITED STATES PATENT AND TRADEMARK OFFICE
CERTIFICATE OF CORRECTION

PATENT NO. : 5,716,569
DATED : February 19, 1998
INVENTOR(S) : Helmut Berenbold et al.

It is certified that error appears in the above-identified patent and that said Letters Patent is hereby corrected as shown below:

Title page,
Item [75], Inventors, add -- Wolfgang Heinnger -- as an inventor.

Signed and Sealed this

Ninth Day of April, 2002

*Attest:*

JAMES E. ROGAN
*Director of the United States Patent and Trademark Office*

*Attesting Officer*